(12) United States Patent
Takuno et al.

(10) Patent No.: US 6,722,482 B2
(45) Date of Patent: Apr. 20, 2004

(54) POWER TRANSFER DEVICE

(75) Inventors: Hiroshi Takuno, Aichi-ken (JP); Yasunari Saito, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/025,918

(22) Filed: Dec. 26, 2001

(65) Prior Publication Data

US 2002/0079178 A1 Jun. 27, 2002

(30) Foreign Application Priority Data

Dec. 25, 2000 (JP) ........................................ 2000-393171

(51) Int. Cl.[7] ........................ F16D 27/00; F16D 27/14; B60K 23/04
(52) U.S. Cl. ...................... 192/35; 192/84.7; 192/84.91
(58) Field of Search ........................ 192/35, 40, 48.2, 192/52.5, 54.52, 57, 84.7, 84.91, 93 A; 180/249, 248; 475/220

(56) References Cited

U.S. PATENT DOCUMENTS

| 5,323,871 | A | | 6/1994 | Wilson et al. | |
|---|---|---|---|---|---|
| 5,366,421 | A | * | 11/1994 | Hirota | ........................ 475/231 |
| 5,437,586 | A | | 8/1995 | Kashiwagi | |
| 5,954,173 | A | * | 9/1999 | Sakai et al. | .................... 192/35 |
| 6,109,408 | A | * | 8/2000 | Ikeda et al. | .................... 192/35 |

FOREIGN PATENT DOCUMENTS

JP        2000-234635        8/2000

* cited by examiner

*Primary Examiner*—Rodney H. Bonck
(74) *Attorney, Agent, or Firm*—Oblon, Spivak, McClelland, Maier & Neustadt, P.C.

(57) ABSTRACT

A power transfer device including a main clutch, a cam mechanism and an electromagnetic pilot clutch mechanism coaxially assembled within a cylindrical space between an external cylindrical rotary member and an internal rotary member, wherein an electromagnetic coil of the pilot clutch mechanism is applied with an electric current to produce pilot torque, the cam mechanism is applied with the pilot torque to produce thrust force in an axial direction, and the main clutch is engaged by the thrust force applied from the cam mechanism to effect drive connection between the rotary members. In the power transfer device, residual thrust force of the cam mechanism is electrically or mechanically decreased at an instance when differential rotation of the rotary members is reversed.

9 Claims, 11 Drawing Sheets

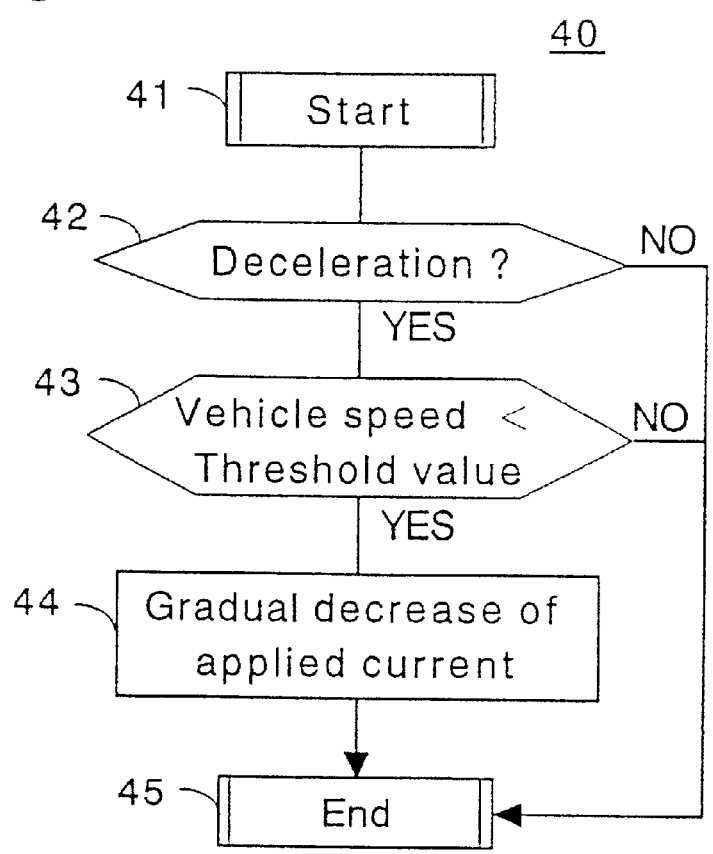

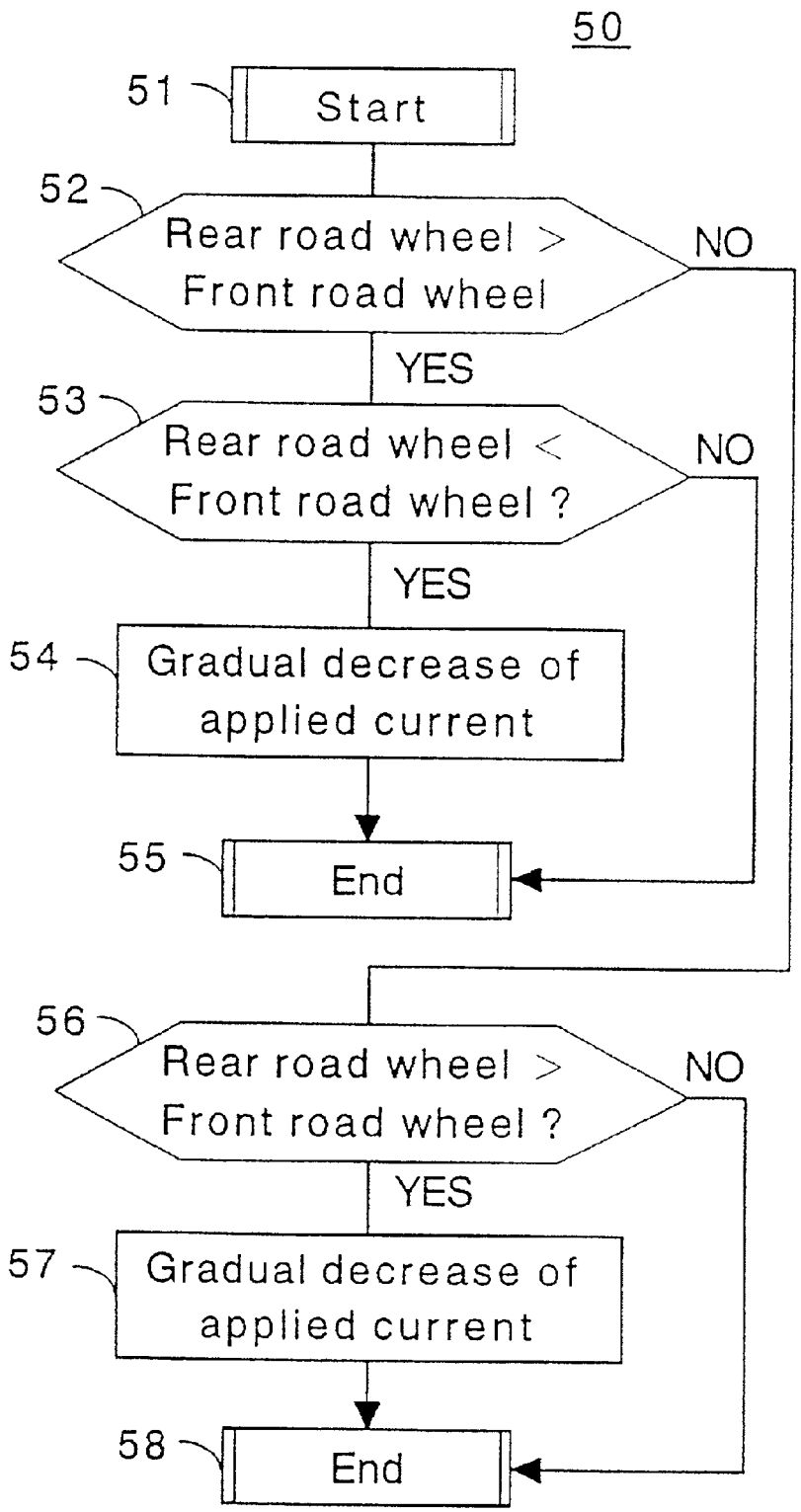

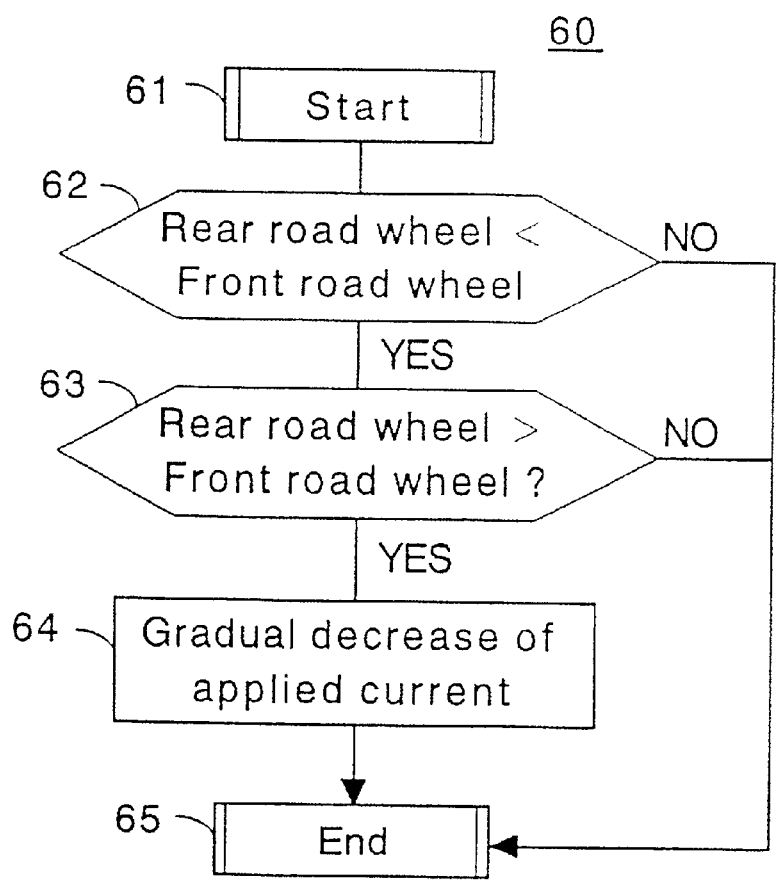

POWER TRANSFER DEVICE

BACKGOURND OF THE INVENTION

1. Field of the Invention

The present invention relates to a power transfer device adapted for use in an automotive vehicle.

2. Discussion of the Prior Art

Disclosed in Japanese Patent Laid-open Publication 2000-234635 is a power transfer device of this kind which comprises a main clutch, a cam mechanism and an electromagnetic pilot clutch mechanism coaxially assembled within a cylindrical space between an external cylindrical rotary member and an internal rotary member. In the power transfer device, an electromagnetic coil of the pilot clutch mechanism is applied with an electric current to produce a pilot torque, the cam mechanism is applied with the pilot torque to produce thrust force in an axial direction, and the main clutch is engaged by the thrust force applied from the cam mechanism to effect transmission of a driving torque between the rotary members.

In use of the power transfer device in a four wheel drive vehicle, harmful noises will occur if differential rotation of the rotary members is reversed in a condition where the main clutch is being engaged by the thrust force applied from the cam mechanism. For example, in use of the power transfer device in a four wheel drive vehicle of the rear-wheel drive type, the differential rotation of the rotary members is reversed if the rotation speed of front road wheels becomes higher than that of rear road wheels due to turning of the vehicle at start. In such an instance, there will occur harmful noises due to clearances at the splined portions of the component parts, defacement of the component parts or a cam angle of the cam mechanism. Such a phenomenon will occur when the vehicle is steered to a straight travel from turning. In use of the power transfer device in a four wheel drive vehicle of the front-wheel drive type or the rear-wheel drive type, the differential rotation of the rotary members is reversed when the vehicle is driven backward from a forward travel or vice versa.

SUMMARY OF THE INVENTION

It is, therefore, a primary object of the present invention to provide a power transfer device capable of eliminating the occurrence of harmful noises when differential rotation of the rotary members is reversed in the foregoing conditions.

According to the present invention, the object is accomplished by providing a power transfer device including a main clutch, a cam mechanism and an electromagnetic pilot clutch mechanism coaxially assembled within a cylindrical space between an external cylindrical rotary member and an internal rotary member, wherein an electromagnetic coil of the pilot clutch mechanism is applied with an electric current to produce a pilot torque, the cam mechanism is applied with the pilot torque to produce thrust force in an axial direction and the main clutch is engaged by the thrust force applied from the cam mechanism to effect drive connection between the rotary members wherein the power transfer device includes means for decreasing a residual thrust force of the cam mechanism at an instance when differential rotation of the rotary members is reversed.

In a practical embodiment of the present invention, the power transfer device is provided with an electric control apparatus for decreasing the electric current applied to the electromagnetic coil of the pilot clutch mechanism at an instance when the differential rotation of the rotary members is reversed.

In another practical embodiment of the present invention, the power transfer device is provided with mechanical means for determining a clearance at a portion of the internal rotary member splined to a cam member of the cam mechanism smaller than a clearance at a portion of the internal rotary member splined to a set of clutch plates of the main clutch.

In a further practical embodiment of the present invention, the power transfer device is provided with mechanical means for determining a cam angle of the cam mechanism larger than a rotation angle caused by a clearance at a portion of a cam member of the cam mechanism splined to a set of clutch plates of the pilot clutch mechanism.

BRIEF DESCRIPTION OF THE DRAWINGS

Other objects, features and advantages of the present invention will be more readily appreciated from the following detailed description of preferred embodiments thereof when taken together with accompanying drawings, in which:

FIG. 5 is a flow chart of a control program executed by a microcomputer of the electric control apparatus;

FIG. 6 is a flow chart of another control program executed by the computer of the electric control apparatus;

FIG. 7 is a flow chart of a control program selectively executed by the computer of the electric control apparatus;

FIG. 8(*b*) is an enlarged schematic illustration of a clearance at a splined portion of inner clutch plates to the inner shaft;

FIG. 9(*b*) illustrates a cam angle of a conventional cam mechanism in the power transfer device;

DESCRIPTION OF THE PREFERRED EMBODIEMNTS

Figure 1:
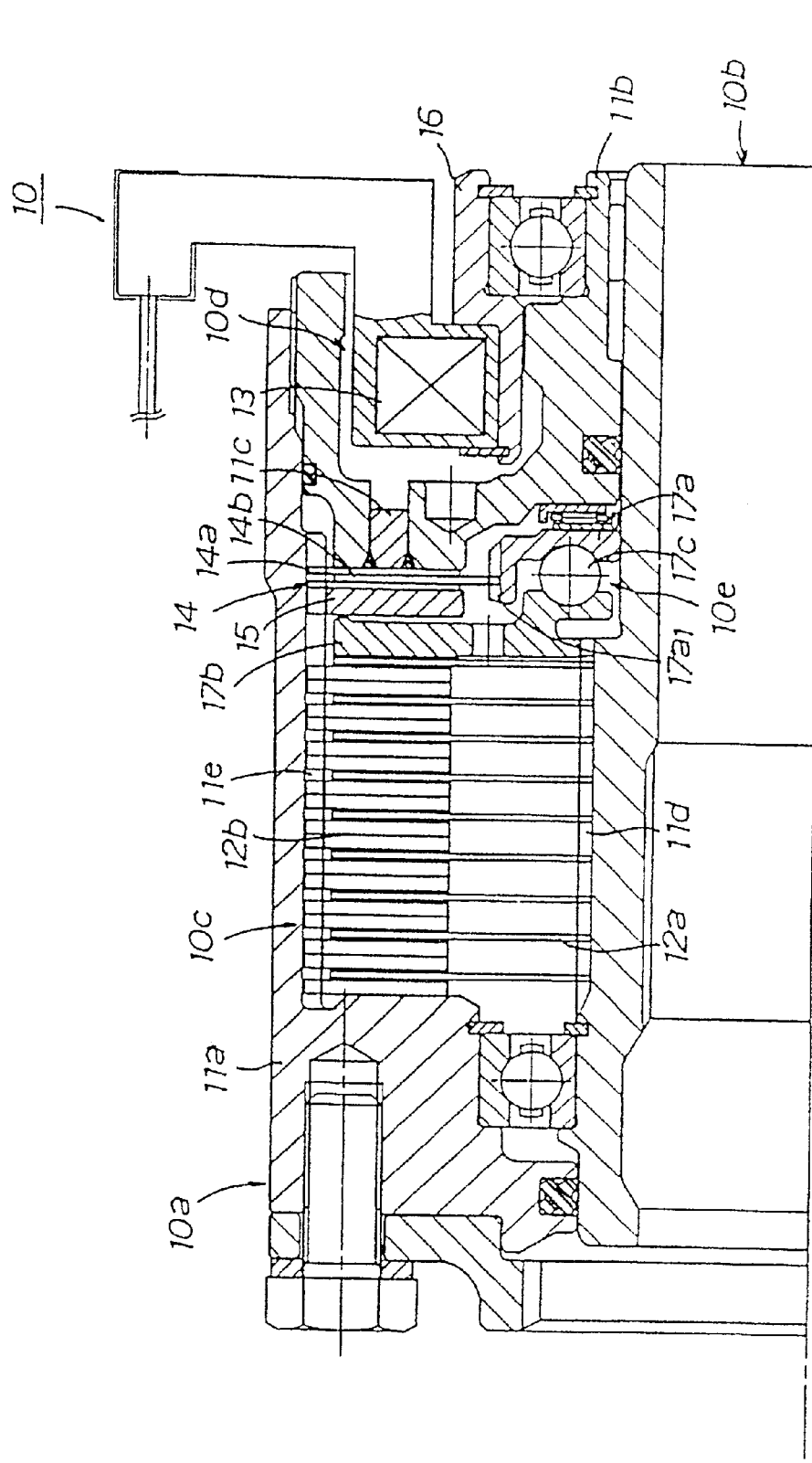
FIG. 1 is a sectional view of a preferred embodiment of a power transfer device in accordance with the present invention.
Figure 2:
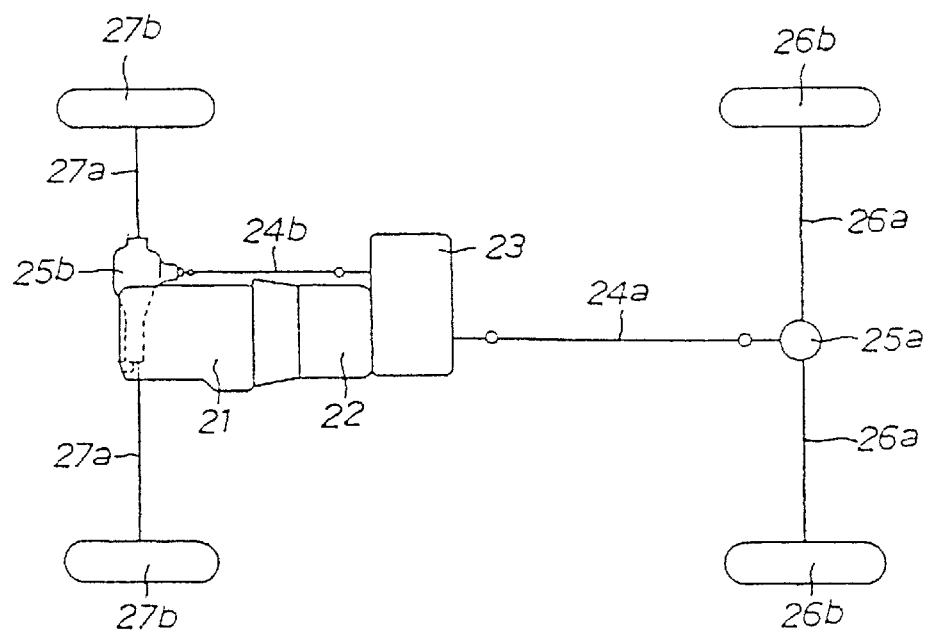
FIG. 2 is a skeleton view of a four wheel drive vehicle of the rear-wheel drive type equipped with the power transfer device.

Illustrated in FIG. 1 is an embodiment of a power transfer device 10 in accordance with the present invention. As shown in FIG. 2, the power transfer device 10 is mounted on a four-wheel drive vehicle of the rear wheel driven type. The four wheel drive vehicle has a transfer assembly 23 mounted to a transmission 22 in drive connection to a prime mover 21. The transfer assembly 23 is placed between rear and front propeller shafts 24a and 24b for continually transferring drive power of the prime mover 21 to the rear propeller shaft 24a and for transferring the drive power to the front propeller shaft 24b when conditioned to establish drive connection between the propeller shafts 24a and 24b.

In a condition where the rear propeller shaft 24a is disconnected from the front propeller shaft 24b, the drive power of the prime mover 21 is transferred to a set of rear axle shafts 26a, 26a from the rear propeller shaft 24 through a rear differential 25a to drive a set of rear road wheels 26a, 26b. When the transfer assembly 23 is conditioned to establish drive connection between the propeller shafts 24a and 24b, the drive power of the prime mover 21 is transferred to a set of front axle shafts 27a, 27a from the front propeller shaft 24b through a front differential 25b to drive a set of front road wheels 27b, 27b.

The power transfer device 10 is assembled within the transfer assembly 23. As shown in FIG. 1, the power transfer device 10 is composed of a main clutch 10c, a pilot clutch mechanism 10d and a cam mechanism 10e coaxially assembled within a cylindrical space between an outer housing 10a and an inner shaft 10b. The outer housing 10a of the power transfer device 10 is in the form of a cylindrical housing 11a the rear end opening of which is closed by a rear end block 11b coupled therein. The cylindrical housing 11a is made of non-magnetic material such as aluminum alloy, and the rear end block 11b is made of magnetic material such as iron. The rear end block 11b includes a cylindrical body 11c of stainless steel embedded therein to form an annular non-magnetic portion. The inner shaft 10b is in the form a hollow shaft inserted into the outer housing 10a through the rear end block 11b in liquid-tight manner and is rotatably supported in place on a front end wall of housing 11a and the rear end block 11b.

The inner shaft 10b is placed in drive connection to the rear propeller shaft 24a inserted in its axial bore and splined thereto. A drive sprocket (not shown) is assembled with the front end wall of housing 11a for rotation therewith, and a driven sprocket (not shown) is coupled with an outer periphery of the front propeller shaft 24b for rotation therewith. The drive and driven sprockets are connected with each other by means of a driving chain (not shown) to transmit drive power of the prime mover from the outer housing 10a to the front propeller shaft 24b.

The main clutch 10c is in the form of a wet-type friction clutch composed of a number of inner clutch plates 12a and a number of outer clutch plates 12b assembled with the outer housing 11a. The inner clutch plates 12a are coupled at their inner spline with outer spline 11d of the inner shaft 10b to be movable in an axial direction, while the outer clutch plates 12b are coupled at their outer spline with inner spline 11e of housing 11a to be movable in an axial direction. The inner clutch plates 12a are interleaved with the outer clutch plates 12b to be brought into frictional engagement with each other.

The pilot clutch mechanism 10d is composed of an annular electromagnet 13, a friction clutch 14, an annular armature 15 and a yoke 16. The annular electromagnet 13 is coupled with the yoke 16 and placed in an annular recess of the rear end block 11b. The yoke 16 is rotatably support on a rear end of the rear end block 11b. The friction clutch 14 is in the form of a wet-type friction clutch composed of a plurality of outer clutch plates 14a and a plurality of inner clutch plates 14b. The outer clutch plates 14a are coupled at their outer spline with inner spline 11e of the housing 11a to be movable in an axial direction, while the inner clutch plates 14b are coupled at their inner spline with outer spline 17a1 formed on a first cam member 17a of the cam mechanism 10e to be movable in an axial direction. The annular armature 15 is coupled with the inner spline 11e of housing 11a to be movable in an axial direction and place and is opposed to the front of friction clutch 14.

In the pilot clutch mechanism 10d, a magnetic flux is formed across the yoke 16, rear end block 1b, friction clutch 14 and armature 15 when a coil 13a of the electromagnet 13 is energized by electric current applied thereto under duty control of an electric control apparatus described later. The electromagnetic coil 13a is selectively energized by operation of a manual switch (not shown) at three drive modes. The manual switch is located adjacent to a driver's seat in a vehicle compartment to be easily operated by a driver.

The cam mechanism 10e is composed of the first cam member 17a, a second cam member 17b and a cam follower 17c. The first cam member 17a is rotatably coupled with the inner shaft 10b and is rotatably supported at one side thereof on the rear end block 11b. The first cam member 17a is coupled at its outer spline with inner spline of the inner clutch plates 14b of friction clutch 14. The second cam member 17b is coupled at its inner spline with the outer spline 11d of inner shaft 10b for rotation therewith and opposed to the rear side of inner clutch plates 12a of main clutch 10c. The cam follower 17c is in the form of a ball disposed in cam grooves formed on the cam members 17a and 17b and opposed to each other.

In the power transfer device 10, the friction clutch 14 of pilot clutch mechanism 10d is disengaged when the electromagnet 13 is in a deenergized condition. In such a condition, the first cam member 17a is rotatable with the second cam member 17b through the cam follower 17c, and the main clutch 10c is maintained in a disengaged condition to disconnect the outer housing 10a from the inner shaft 10b. Thus, the rear road wheels 26b, 26b of the vehicle are driven at a first drive mode for two wheel drive.

When the electromagnet 13 of the pilot clutch mechanism 10d is energized by electric current applied thereto, the armature 15 is attracted by magnetic force of the electromagnet 13 to effect engagement of the friction clutch 14. In such a condition, the first cam member 17a rotates with the outer housing 10a. This causes relative rotation between the cam members 17a and 17b and causes the cam follower 17c to move the second cam member 17b toward the main clutch 10c. As a result, the main clutch 10c is pressed by the second cam member 17b toward the front end wall of housing 11a and engaged in accordance with engagement force of the friction clutch 14 to effect drive connection between the housing 10a and inner shaft 10b. Thus, drive connection between the propeller shafts 24a and 24b is effected in accordance with the engagement force of friction clutch 14 at a second drive mode for four-wheel drive. At this second drive mode, the distribution ratio of driving force between the front and rear road wheels can be controlled in a range of 100:0.

Figure 4:
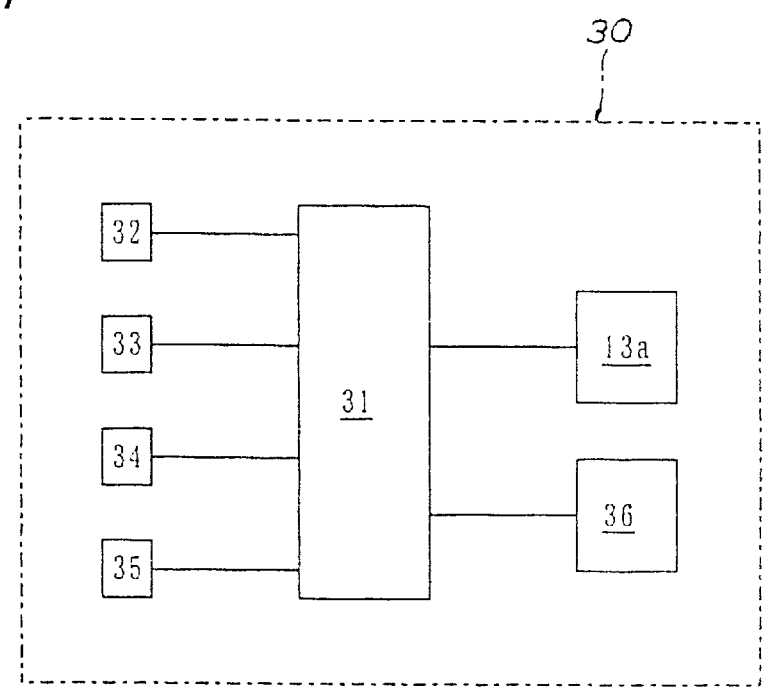
FIG. 4 is a block diagram of an electric control apparatus adapted to the power transfer device.

At the second drive mode, the electromagnet 13 is applied with the electric current under duty control of the electric control apparatus in accordance with a running condition of the vehicle and a road surface condition in response to detection signals applied from road wheel speed sensors 32, 33, an accelerator sensor 34, a steering angle sensor 35 shown in FIG. 4 so that the thrust force of cam mechanism 10e caused by the engagement force of friction clutch 14 is controlled for control of the driving torque transmitted to the front road wheels. When the electric current applied to the electromagnet 13 is increased to a predetermined value, the attraction force of electromagnet 13 to the armature 15 is increased to increase the engagement force of friction clutch 14. As a result, the thrust force of cam mechanism 10e is increased to maintain the engagement of main clutch mechanism 10c thereby to effect direct drive connection of the propeller shafts 24a and 24b at a third drive mode for four-wheel drive.

Figure 3:
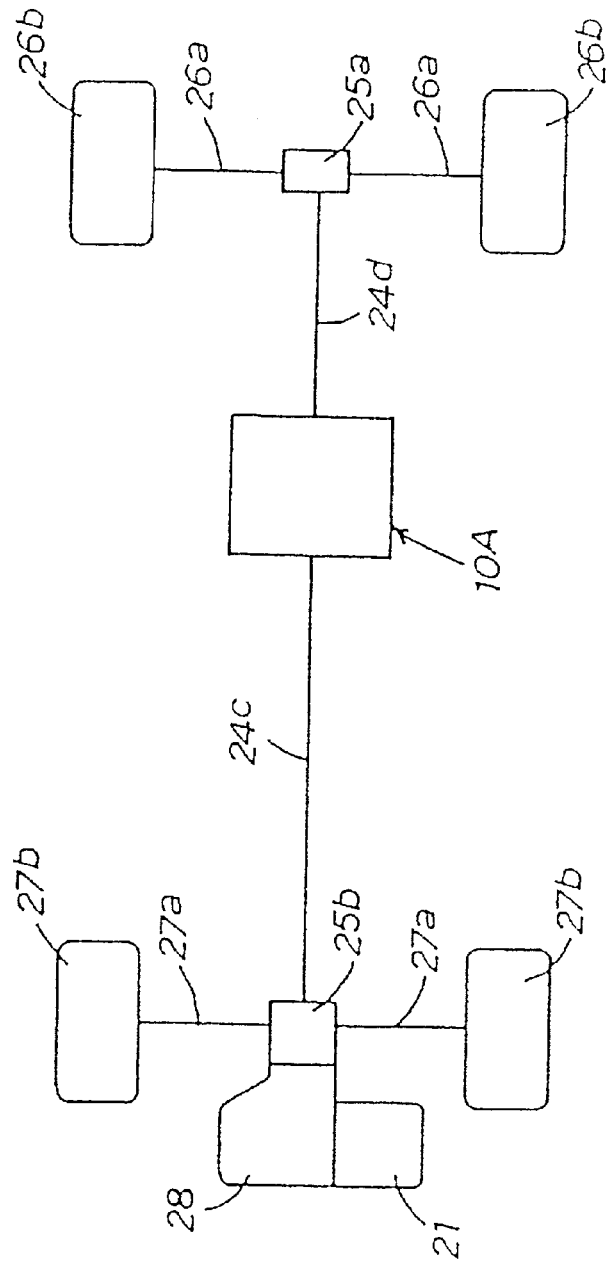
FIG. 3 is a skeleton view of a four wheel drive vehicle of the front-wheel drive type equipped with the power transfer device.

Although the power transfer device 10 has been mounted on the four wheel drive vehicle of the rear-wheel drive type as shown in FIG. 2, the power transfer device 10 may be modified to a power transfer device 10A for use in a four wheel drive vehicle of the front-wheel drive type as shown in FIG. 3. In the power transfer device 10A, the outer housing 10a is placed in drive connection to a first propeller shaft 24c, and the hollow inner shaft 20b is placed in drive connection to a second propeller shaft 24d inserted therein. In the four wheel drive vehicle equipped with the power transfer device 10A, a transaxle 28 is mounted to a prime mover 21 of the vehicle, and a front differential 25b is mounted to the transaxle 25b to transmit drive power of the prime mover 21 applied therethrough to front-axle shafts 27a and 27b for driving front road wheels 27b and 27b and to the first propeller shaft 24c. The first propeller shaft 24c is connected to the second propeller shaft 24d through the power transfer device 10A, and rear differential 25a is placed in drive connection to the second propeller shaft 24d to transmit the driving force of prime mover 21 to rear-axle shafts 26a, 26a for driving rear road wheels 26b, 26b.

In the power transfer device 10, means for decreasing residual thrust force of the cam mechanism is provided to prevent the occurrence of harmful noises in operation of the transfer device 10. The means for decreasing residual thrust force of the cam mechanism is provided in the form of the electric control apparatus 30 shown in FIG. 4, first mechanical means or second mechanical means described later. The electric control apparatus 30 is provided to control the electric current applied to the electromagnetic coil 13a in the pilot clutch mechanism 10d for decreasing the applied electric current at an instance when differential rotation of the outer housing 10a and inner shaft 10b is reversed and for decreasing residual thrust force of the cam mechanism 10e.

As shown in FIG. 4, the electric control apparatus 30 includes a microcomputer 31 connected to the front-wheel speed sensor 32 for detecting rotation speed of the front road wheels, the rear-wheel speed sensor 33 for detecting rotation speed of the rear road wheels, an accelerator sensor 34 for detecting an opening degree of an accelerator, and a steering angle sensor 35 for detecting steerage of the vehicle. When connected to an electric power source 36, the microcomputer 31 starts to selectively execute control programs shown by flow charts in FIGS. 5, 6 and 7 and to execute control programs (not shown) for control of driving conditions of the four wheel drive vehicle.

Figure 8A:
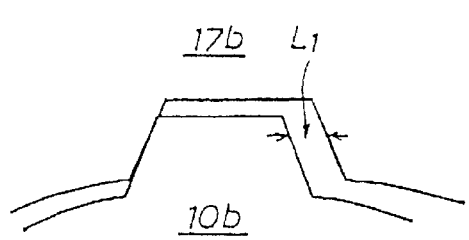
FIG. 8(*a*) is an enlarged schematic illustration of a clearance at a splined portion of a cam member to an inner shaft.
Figure 8B:
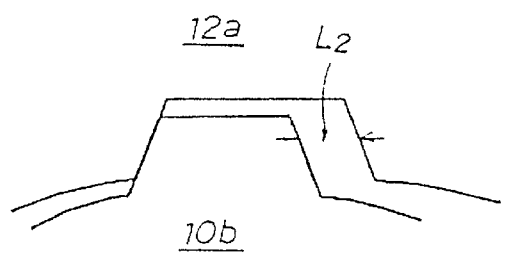
Figure 9A:
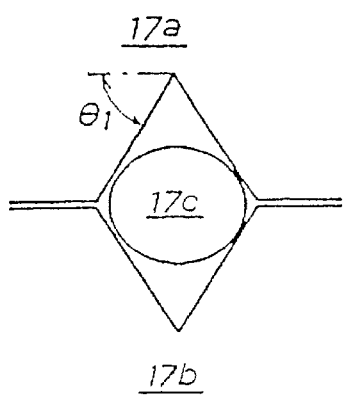
FIG. 9(*a*) illustrates a cam angle of a cam mechanism in the power transfer device shown in FIG. 1.
Figure 9B:
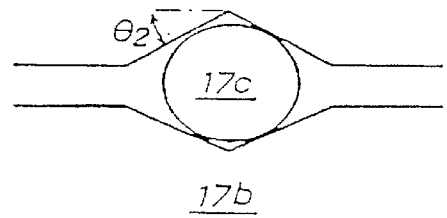

As shown in FIGS. 8(a) and 8(b), the first mechanical means is adapted to determine a clearance L1 at the splined portion of the second cam member 17b to the inner shaft 10b smaller than a clearance L2 at the splined portion of the inner clutch plates 12a to the inner shaft 10b. As shown in FIG. 9(a), the second mechanism means is adapted to determine a cam angle θ1 of the cam mechanism 10e lager than a rotation angle caused by a clearance at the splined portion of the inner clutch plates 14b of pilot clutch mechanism 10d to the first cam member 17a of the cam mechanism 10e. In general, the cam angle of a conventional cam mechanism in the power transfer device is determined to be an angle θ2 as shown in FIG. 9(b). In other words, the cam angle θ1 of the cam mechanism 10e is determined to be lager than the cam angle θ2 of the conventional cam mechanism.

Figure 10:
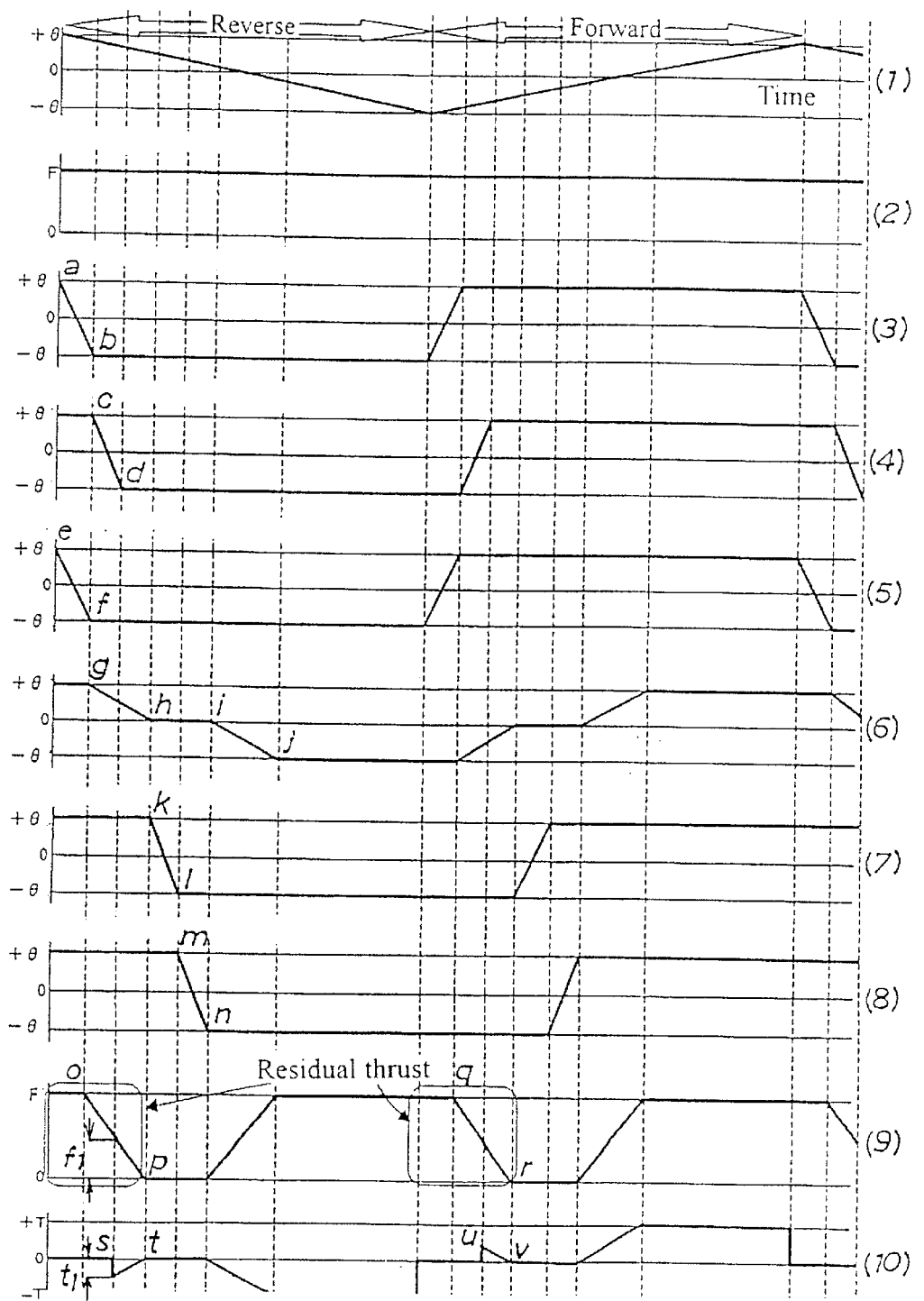
FIG. 10 illustrates time charts showing each operation of conventional component parts in the power transfer device.
Figure 11:
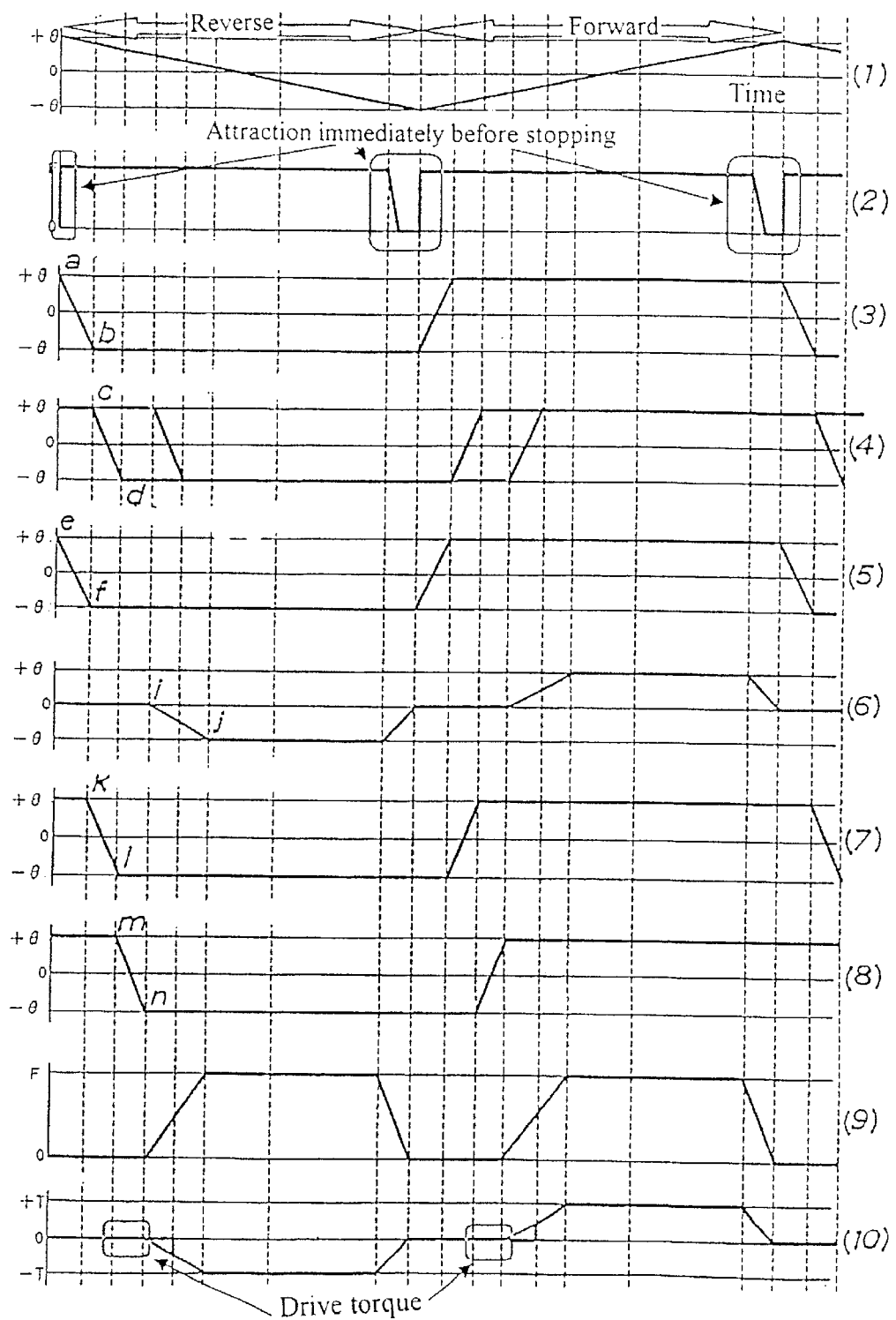
FIG. 11 illustrates time charts showing each operation of component parts in the power transfer device under control of the electric control apparatus.
Figure 12:
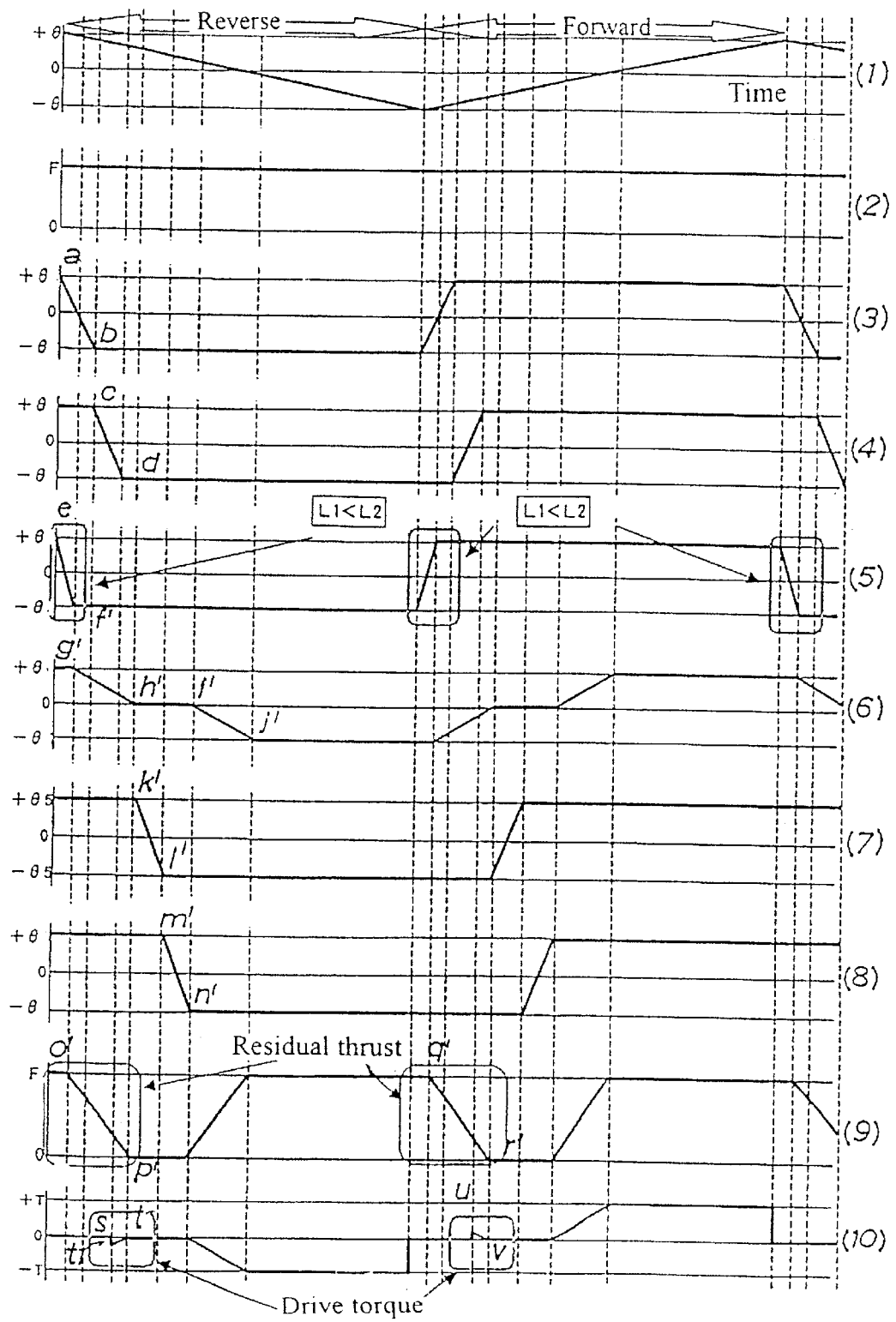
FIG. 12 illustrates time charts showing each operation of component parts in the power transfer device in the case that the clearance at the splined portion of the cam member is arranged as shown in FIG. 8(*a*)
Figure 13:
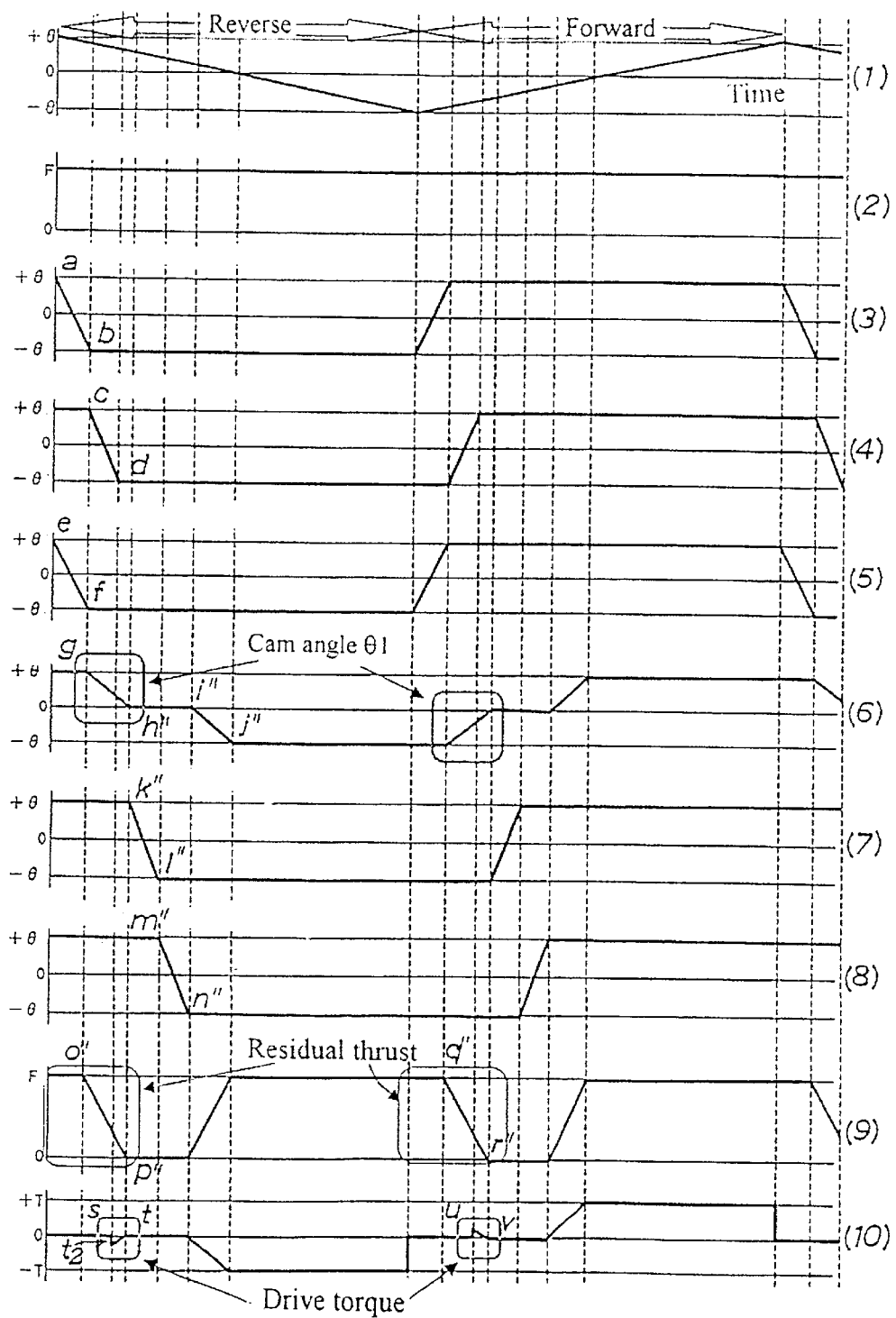
FIG. 13 illustrates time charts showing each operation of component parts in the power transfer device in the case that the cam angle of the cam mechanism is arranged as shown in FIG. 9(*a*).

Illustrated in FIGS. 10 to 13 are time charts showing movement conditions of the component parts of the cam mechanism at an instance when differential rotation of the outer housing 10a and inner shaft 10b is reversed in operation of the transfer device 10. The time charts of FIG. 10 illustrate movement conditions of the component parts in the conventional cam mechanism, while the time charts of FIG. 11 illustrate movement conditions of the component parts of the cam mechanism 10e under control of the electric control apparatus 30. The time charts of FIG. 12 illustrate movement conditions of the first mechanical means, and the time charts of FIG. 13 illustrate movement conditions of the second mechanical means. In the power transfer device 10, the inner shaft 10b acts as an input member of the driving torque, and the outer housing 10a acts as an output member of the driving torque.

In FIG. 10, a time chart (1) illustrates reverse rotation of the inner shaft 10b from +θ to −θ and forward rotation of the inner shaft 10b from −θ to +θ at an instance when the rotation of inner shaft 10b is reversed. A time chart (2) illustrates attraction force F applied to the armature 15 in the pilot clutch mechanism 10d at the third drive mode where the main clutch 10c is engaged to effect drive connection between the outer housing 10a and inner shaft 10b. A time chart (3) illustrates a reverse rotation angle of the inner shaft 10b from +θ to −θ in lapse of a time at a clearance of the splined portion to the inner clutch plates 12a of main clutch 10c. When the reverse rotation angle of inner shaft 10b becomes −θ at a point of time b the inner spline of inner clutch plates 12a are brought into engagement with the outer spline 11d of inner shaft 10b. A time chart (4) illustrates a rotation angle of the outer clutch plates 12b of main clutch 10c from +θ to −θ in lapse of a time at a clearance of the splined portion to the outer housing 11a. When the outer spline 11d of inner shaft 10b was engaged with the inner spline of inner clutch plates 12a at a point of time b, the outer spline of outer clutch plates 12b start to engage with the inner spline of outer housing 11a at a point of time c coincident with the point of time b and completely engaged with the inner spline of outer housing 11a at a point of time d.

A time chart (5) in FIG. 10 illustrates a rotation angle of the inner shaft 10b from +θ to −θ in lapse of a time at a clearance of the splined potion to the second cam member 17b of cam mechanism 10e. The outer spline of inner shaft 10b starts to rotate from +θ to −θ at a point of time e for engagement with the inner spline of second cam member 17b and completely engaged with the inner spline of second cam member 17b at a point of time f. In the conventional power transfer, the points of time e and f coincide with the points of time a and b in the time chart (3). A time chart (6) of FIG. 10 illustrates a cam angle in the cam mechanism 10e from +θ to −θ in lapse of a time. As shown in the time chart (6), the cam angle starts to change from +θ to −θ at a point of time g and becomes 0 at a point of time h. Subseuqnelty, the cam angle in the cam mechanism 10e starts to change from 0 to −θ at a point of time i. The point of time g coincides with the points of time b, c and f. A time chart (7) of FIG. 10 illustrates a rotation angle of the first cam member 17a in lapse of a time at a clearance of the splined portion to the inner clutch plates 14b of friction clutch 14 in the pilot clutch mechanism 10d. As illustrated in the time chart (7), the rotation angle of the first cam member 17a starts to change from +θ to −θ at a point of time k, and the outer spline of first cam member 17a is brought into engagement with the inner clutch plates 14b at a point of time l. The point of time k coincides with the point of time h at which the cam mechanism 10e is retained in a neutral condition.

A time chart (8) in FIG. 10 illustrates a rotation angle of the outer clutch plates 14a in lapse of a time at a clearance of the splined portion to the outer housing 10a. As shown in the time chart (8), the outer clutch plates 14a start to rotate from +θ to −θ at a point of time m for engagement with the inner spline of outer housing 11a and are completely engaged with the inner spline of outer housing 11a when rotated to −θ at a point of time n. The point of time m coincides with the point of time l at which the first cam member 17a is engaged with the inner clutch plates 14b. A time chart (9) in FIG. 10 illustrates thrust force F of the cam mechanism 10e in lapse of a time. As the thrust force F is proportional to an absolute value of the relative rotation angle of the cam members, the thrust force F starts to decrease at a point of time o and becomes zero at a point of time p. The points of time o and p coincide with the points of time g and h, respectively. The thrust force F remains as residual thrust force f1 for a period between the points of time o and p. In addition, the thrust force F remains as residual thrust force for a period between points of time q and r which correspond with the period between the points of time o and p when the rotation of inner shaft 10b is reversed to effect reverse drive of the vehicle.

A time chart (9) of FIG. 10 illustrates drive torque of the main clutch 10c.

In lapse of a time. As shown in the time chart (9), the drive torque of the main clutch 10c is generated due to the residual thrust force f1 of the cam mechanism in a period between points of time s and t after the inner clutch plates 12a of main clutch 10c were completely engaged with the inner shaft 10b at the point of time d as shown in the time chart (4). The drive torque of the main clutch 10c is also generated in a period between points of time u and v in the time chart. This causes harmful noises in operation of the power transfer device 10. Accordingly, if an amount of the residual thrust force f1 in each period between the points of time o and p and between the points of time q and r is decreased or eliminated, the drive torque of the main clutch 10c shown in the time chart (10) can be decreased or eliminated to prevent the occurrence of harmful noises in operation of the power transfer device 10.

The phenomenon shown in FIG. 10 will occur in the power transfer device 10a used in the four-wheel drive vehicle of the front-wheel drive type. Thus, in this embodiment, the electric control apparatus 30 shown in FIG. 4, the first mechanical means shown in FIGS. 8(a) and 8(b) or the second mechanical means shown in FIG. 9(a) is selectively adapted to decrease or eliminate the residual thrust force of the cam mechanism thereby to prevent the occurrence of harmful noises in operation of the power transfer device.

When the prime mover of the vehicle is started, the microcomputer 31 of the electric control apparatus 30 starts to execute the control programs shown by flow charts 40, 50 and 60 in FIGS. 5, 6 and 7 for controlling an electric current applied to the coil 13a of electromagnet 13 in such a manner that the drive torque of main clutch 10c is eliminated as shown in the time charts of FIG. 11.

The control program of FIG. 5 is arranged to control operation of the power transfer device 10A mounted on the four-wheel drive vehicle of the front-wheel drive type. When started execution of the control program at step 41, the computer 31 determines at step 42 whether the vehicle speed was decreased or not. If the answer at step 42 is "No", the computer 31 finishes the execution of the control program at step 45. If the answer at step 42 is "Yes", the computer 31 determines at step 43 whether the movement of the vehicle is immediately before stopping or no. When the vehicle speed is higher than a threshold value, the computer 31 determines a "No" answer at step 43 and finishes the execution of the control program at step 45. If the vehicle speed is lower than the threshold value, the computer 31 determines a "Yes" answer at step 43 and produces a control signal for gradually decreasing the electric current applied to the coil 13a of electromagnet 13. This causes the attraction force of electromagnet 13 to decrease immediately before stopping of the vehicle as shown in a time chart (2) of FIG. 11. As a result, the residual thrust f of the cam mechanism becomes zero as shown in a time chart (9) of FIG. 11, and the driving, torque of the main clutch 10c is eliminated as shown in a time chart (10) of FIG. 11. This is effective to prevent the occurrence of harmful noises when the movement of the vehicle is reversed from a forward travel to a backward travel or vice versa.

The control program of FIG. 6 is arranged to control operation of the power transfer device 10 used in the four wheel drive vehicle of the rear-wheel drive type. When started execution of the control program 50 at step 51, the computer 31 determines at step 52 whether the rotation speed of the rear road wheels is higher than that of the front road wheels or not. If the answer at step 52 is "Yes", the program proceeds to step 53. If the answer at step 52 is "No", the program proceeds to step 56. At step 53, the computer 31 reads out detection signals of the steering angle sensor and the accelerator sensor to determine whether the rotation speed of the rear road wheels becomes lower than that of the front road wheels or not. If the answer at step 53 is "No", the computer 31 finishes the execution of the program at step 55. If the answer at step 53 is "Yes", the computer 31 produces at step 54 a control signal for gradually decreasing the electric current applied to the coil 13a of electromagnet 13. As a result, the electric current applied to the coil 13a of electromagnet 13 is gradually decreased in response to the control signal from the computer 31.

When determined a "No" answer at step 52, the computer 31 reads out at step 56 detection signals of the steering angle sensor and the accelerator sensor to determine whether the rotation speed of the rear road wheels becomes higher than that of the front road wheels or not. If the answer at step 56 is "No", the computer 31 finishes the execution of the program at step 58. If the answer at step 56 is "Yes", the computer 31 produces at step 57 a control signal for gradually decreasing the electric current applied to the coil 13a of electromagnet 13 and finishes the execution of the program at step 58. As a result, the electric current applied to the coil 13a of electromagnet 13 is gradually decreased in response to the control signal from the computer 31.

The control program of FIG. 7 is arranged to control operation of the power transfer device 10 used in the four wheel drive vehicle of the rear-wheel drive type. When started execution of the control program 60 at step 61 the computer 31 determines at step 62 whether the rotation speed of the rear road wheels is lower than that of the front road wheels or not. If the answer at step 62 is "No", the computer 31 finishes the execution of the program at step 65.

If the answer at step 62 is "Yes", the computer 31 reads out at step 63 detection signals of the steering angle sensor and the accelerator sensor to determine whether the rotation speed of the rear road wheels becomes higher than that of the front road wheels or not. If the answer at step 63 is "No", the computer 31 finishes the execution of the program at step 65. If the answer at step 63 is "Yes", the computer 31 produces at step 64 a control signal for gradually decreasing the electric current applied to the coil 13*a* of electromagnet 13 and finishes the execution of the program at step 65. As a result, the electric current applied to the coil 13*a* of electromagnet 13 is gradually decreased in response to the control signal from the computer 31.

In the electric control apparatus 30, the foregoing control programs are selectively executed by the computer 31 in an appropriate manner to control operation of the power transfer device 10 or 10A as shown in the time charts of FIG. 11 thereby to prevent the occurrence of harmful noises in operation of the power transfer device.

As is understood from the above description, the electric control apparatus 30 is adapted to the power transfer device 10 or 10A for gradually decreasing the electric current applied to the coil 13*a* of electromagnet 13 when the differential rotation of the outer housing 10*a* and inner shaft 10*b* is reversed. Under such control of the electric current, residual thrust force f of the cam mechanism is decreased to eliminate the driving torque of the main clutch 10*c* thereby to prevent the occurrence of harmful noises in operation of the power transfer device. In a practical embodiment of the present invention, the first mechanical means shown in FIG. 8 or the second mechanical means shown in FIG. 9 may be substituted for the electric control apparatus 30.

In the first mechanical means shown in FIGS. 8(*a*) and 8(*b*), the clearance L1 at the splined portion of the inner shaft 10*b* and the second cam member 17*b* of cam mechanism 10*e* is determined smaller than the clearance L2 at the splined portion of the inner shaft 10*b* and the inner clutch plates 12*a* of main clutch 10*c*. With such arrangement of the clearances at the splined portions, as shown in time charts (3) and (5) of FIG. 12 the inner spline of second cam member 17*b* is engaged with the outer spline of inner shaft 10*b* at a point of time f' before a point of time b where the inner clutch plates 12*a* are brought into engagement with the outer spline of inner shaft 10*b*. As a result, as shown in a time chart (6) of FIG. 12, the cam mechanism 10*e* starts to return to the neutral condition at a point of time g', and the residual thrust force of the cam mechanism 10*e* at a point of time d in a time chart (4) of FIG. 12 becomes smaller than the residual thrust force f1 shown in FIG. 10. Thus, at an instance when the differential rotation of the outer housing 10*a* and inner shaft 10*b* is reversed, the residual thrust force of the cam mechanism 10*e* is decreased to decrease the drive torque of main clutch 10*c* thereby to prevent the occurrence of harmful noises in operation of the power transfer device.

In the second mechanical means shown in FIGS. 9(*a*) and 9(*b*), the cam angle θ1 of the cam mechanism 10*e* is determined larger than the rotation angle θ2 of inner shaft 10*b* at the clearance of the splined portion to the inner clutch plates 14*b* of pilot clutch mechanism 10*d*. With such arrangement of the cam angle θ1, as shown in a time chart (6) of FIG. 13, the cam mechanism 10*e* is returned to the neutral condition at a point of time h" prior to the point of time h in the time chart (6) of FIG. 10. As a result, the residual thrust force of the cam mechanism 10*e* at a point of time d in a time chart (4) of FIG. 13 becomes smaller than the residual force f1 shown in FIG. 10. Thus, at an instance when the differential rotation of the outer housing 10*a* and inner shaft 10*b* is reversed, the residual thrust force of the cam mechanism 10*e* is decreased to decrease a drive torque t2 of the main clutch 10*c* less than the drive torque t shown in the time chart (10) of FIG. 10. This is effective to prevent the occurrence of harmful noises in operation of the power transfer device.

What is claimed is:

1. A power transfer device including a main clutch, a cam mechanism and an electromagnetic pilot clutch mechanism coaxially assembled within a cylindrical space between an external cylindrical rotary member and an internal rotary member, wherein an electromagnetic coil of the pilot clutch mechanism is applied with an electric current to produce a pilot torque, the cam mechanism is applied with the pilot torque to produce thrust force in an axial direction and the main clutch is engaged by the thrust force applied from the cam mechanism to effect drive connection between the rotary members, wherein the power transfer device includes means for decreasing residual thrust force of the cam mechanism at an instance when differential rotation of the rotary members is reversed when the main clutch is being engaged by the thrust force applied from the cam mechanism.

2. A power transfer device as claimed in claim 1, wherein said means for decreasing residual thrust force of the cam mechanism is in the form of an electric control apparatus for decreasing the electric current applied to the electromagnetic coil of the pilot clutch mechanism at an instance when the differential rotation of the rotary members is reversed.

3. A power transfer device as claimed in claim 1, wherein said means for decreasing residual thrust force of the cam mechanism is in the form of mechanical means for determining a clearance at a portion of the internal rotary member splined to a cam member of the cam mechanism smaller than a clearance at a portion of the internal rotary member splined to a set of clutch plates of the main clutch.

4. A power transfer device as claimed in claim 1, wherein said means for decreasing residual thrust force of the cam mechanism is in the form of mechanical means for determining a cam angle of the cam mechanism larger than a rotation angle caused by a clearance at a portion of a cam member of the cam mechanism splined to a set of clutch plates of the pilot clutch mechanism.

5. A power transfer device comprising:

a main clutch, a cam mechanism, and an electromagnetic pilot clutch mechanism coaxially assembled within a cylindrical space between an external cylindrical rotary member and an internal rotary member, wherein an electromagnetic coil of the pilot clutch mechanism is applied with an electric current to produce a pilot torque, the cam mechanism is applied with the pilot torque to produce thrust force in an axial direction, and the main clutch is engaged by the thrust force applied from the cam mechanism to effect drive connection between the rotary members; and an electrical controller configured to decrease residual thrust force of the cam mechanism at an instance when differential rotation of the rotary members is reversed when the main clutch is being engaged by the thrust force applied from the cam mechanism.

6. A power transfer device as claimed in claim 5, wherein said electrical controller decreases the residual thrust force of the cam mechanism by decreasing the electric current applied to the electromagnetic coil of the pilot clutch mechanism at an instance when the differential rotation of the rotary members is reversed.

7. A power transfer device comprising:

a main clutch, a cam mechanism, and an electromagnetic pilot clutch mechanism coaxially assembled within a cylindrical space between an external cylindrical rotary member and an internal rotary member, wherein an electromagnetic coil of the pilot clutch mechanism is applied with an electric current to produce a pilot torque, the cam mechanism is applied with the pilot torque to produce thrust force in an axial direction, and the main clutch is engaged by the thrust force applied from the cam mechanism to effect drive connection between the rotary members; and a mechanical detector configured to decrease residual thrust force of the cam mechanism at an instance when differential rotation of the rotary members is reversed.

8. A power transfer device as claimed in claim 7, wherein said mechanical detector determines a clearance at a portion of the internal rotary member splined to a cam member of the cam mechanism smaller than a clearance at a portion of the internal rotary member splined to a set of clutch plates of the main clutch.

9. A power transfer device as claimed in claim 7, wherein said mechanical detector determines a cam angle of the cam mechanism larger than a rotation angle caused by a clearance at a portion of a cam member of the cam mechanism splined to a set of clutch plates of the pilot clutch mechanism.

* * * * *